United States Patent [19]
MacLeod

[11] 3,872,037
[45] Mar. 18, 1975

[54] IMPROVED CARBOXYLIC LATEX FOR PAPER COATING UTILIZING BUTADIENE-STYRENE-ACRYLIC ACID-ACROLEIN TETRAPOLYMERS

[75] Inventor: Alastair Cameron MacLeod, Sarnia, Ontario, Canada

[73] Assignee: Polysar Limited-Polysar Limitee, Sarnia, Ontario, Canada

[22] Filed: Jan. 26, 1973

[21] Appl. No.: 327,227

Related U.S. Application Data
[62] Division of Ser. No. 204,748, Dec. 3, 1971.

[30] Foreign Application Priority Data
Dec. 11, 1970 Canada .............................. 100375

[52] U.S. Cl. ......... 260/8, 260/29.7 T, 117/155 UA, 117/161 UT, 260/17.4 ST
[51] Int. Cl. ..... C08f 15/40, C08f 19/08, C08f 45/06

[58] Field of Search... 260/8, 67 UA, 29.7 T, 17.4 ST

[56] References Cited
UNITED STATES PATENTS
| | | | |
|---|---|---|---|
| 3,231,538 | 1/1966 | Tsotsos | 260/29.7 T |
| 3,409,569 | 11/1968 | Love et al. | 260/8 |
| 3,733,286 | 5/1973 | Holly et al. | 260/17.4 ST |

Primary Examiner—Howard E. Schain
Assistant Examiner—Peter F. Kulkosky
Attorney, Agent, or Firm—Stevens, Davis, Miller & Mosher

[57] ABSTRACT

An improved carboxylic latex is produced by copolymerizing e.g. butadiene, styrene, acrylic acid and acrolein in an emulsion system comprising a synthetic emulsifier. The latex is suitable for treating fibrous materials e.g. textile and paper.

10 Claims, No Drawings

IMPROVED CARBOXYLIC LATEX FOR PAPER COATING UTILIZING BUTADIENE-STYRENE-ACRYLIC ACID-ACROLEIN TETRAPOLYMERS

This is a division, of application Ser. No. 204,748, filed 12-3-71.

This invention is directed to the preparation of carboxylic latex compositions. It further relates to latex compositions suitable for treating fibrous materials.

Carboxylic latices of butadiene polymers have been used in the preparation of fibrous products such as non-woven materials, coated paper, upholstery textiles and carpets. In these applications, latex acts as a binder for fibers and/or filler particles; the more latex used, the better is the strength of the material; however, excessive amounts are to be avoided so that the appearance and absorptive properties of the treated fibrous products are changed as little as possible.

Attempts have been made to find a compromise between these conflicting requirements and to improve the binding power of the carboxylic latex so that it could be used in smaller amounts.

The object of this invention is to prepare a carboxylic latex having improved binding power. Another object is to provide an improved carboxylic latex composition for treating fibrous materials. A further object is to provide a latex composition suitable for use in coated paper.

The present invention provides an aqueous latex composition suitable for treating fibrous materials which comprises a dispersion in an aqueous solution of a synthetic emulsifier of a polymer comprising monomeric units of (1) at least about 25 parts by an acylic conjugated diolefin, (2) at least about 25 parts of a mono-olefinically unsaturated copolymerizable compound, said compound being free of carbonyl and carboxyl acid groups, (3) from 0.1 to about 5 parts of an olefinically unsaturated carboxylic acid and (4) from 0.1 to about 5 parts of an olefinically unsaturated carbonyl compound, said parts being parts by weight per 100 parts by weight of polymer.

This invention provides also a process of producing a latex composition for treating fibrous materials which comprises:

A. polymerizing a monomer mixture comprising
   a. at least about 25 parts of an acylic conjugated diolefin,
   b. at least about 25 parts of a mono-olefinically unsaturated copolymerizable compound, said compound being free of carbonyl and carboxyl acid groups,
   c. from 0.1 to about 5 parts of an olefinically unsaturated carboxylic acid, and
   d. from 0.1 to about 5 parts of an olefinically unsaturated carbonyl compound, said parts being parts by weight per 100 parts of monomer mixture,
said polymerization being carried out in an aqueous emulsion containing a synthetic anionic emulsifier to produce a fluid latex of copolymer of said monomers having a solids content of at least 40 percent and a pH of about 2 to less than 7; and B. raising the pH of the latex to a pH of about 7 to about 11 to produce said composition.

The conjugated diolefin monomer used in this invention is an acyclic diene having from 4 to 8 carbon atoms as for example butadiene-1,3, isoprene, chloroprene and 2,3-dimethylbutadiene-1,3, of which butadiene 1,3 is preferred. The mono-olefinically unsaturated copolymerizable compound free of carbonyl and carboxyl acid groups may be styrene or a substituted styrene monomer as for example alpha-methylstyrene, vinyl toluene and alpha-chlorostyrene; or an ester derived from acrylic acids and alcohols containing 1 to 6 carbon atoms as for example methyl acrylate, methyl methacrylate and butyl methacrylate; or an acrylic nitrile such as acrylonitrile, methacrylonitrile and ethacrylonitrile; or a mixture of the above recited. Styrene and substituted styrenes are preferably used. Suitable ethylenically unsaturated acid monomers include acrylic acid, ethacrylic acid, methacrylic acid, itaconic acid, cinnamic acid and mixtures thereof.

The olefinically unsaturated carbonyl compound is a monomer having an olefinic group and a carbonyl group represented by the general formula:

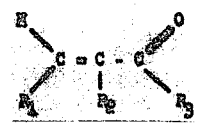

where $R_1$ is hydrogen or a monovalent hydrocarbon radical of 1–6 carbon atoms and $R_2$ and $R_3$ are hydrogen atoms or $C_1$-$C_2$ alkyl radicals. Representative examples of carbonyl compounds which can be used in this invention are acrolein, $\alpha$-methyl acrolein, $\beta$-methyl acrolein, $\beta$-phenyl acrolein, methyl vinyl ketone as well as other vinyl alkyl ketones, and their mixtures. Acrolein is the preferred carbonyl compound.

The copolymer produced in accordance with this invention consists of at least four monomeric units. The first two monomers, the acyclic conjugated diolefin and the mono-olefinically unsaturated copolymerizable compound, constitute a major part of the polymer, not less than 90 parts per 100 parts by weight of polymer. The proportion of these two monomeric units may vary within wide limits but it is preferable that they be present in an amount of at least 25 parts per 100 parts by weight of polymer.

In applications where flexible copolymer is required, the conjugated diolefin is used preferably in amounts from about 50 to about 70 parts; the monoolefin makes up the rest of the major part of the copolymer. When on the other hand, a stiffer copolymer is desired as for paper coating, the monoolefin is used in amounts from about 50 to about 70 parts and the conjugated diolefin makes up the rest of the major part of the copolymer.

The other two monomers, the carboxylic acid compound and the carbonyl compound, constitute a minor part of the polymer, not more than 10 parts per 100 parts by weight of polymer and preferably not more than 6 parts. The amount of carboxylic acid monomer may vary from about 0.1 to 5 percent by weight of total monomer but preferably is within the range of 1 to 3 percent, particularly when the latex is to be used in paper coatings containing starch. The unsaturated carbonyl compound may be employed in an amount from about 0.1 to about 5 percent by weight of total monomer, although about 1 to 3 parts are preferred. The proportion of the carboxylic acid monomer to the carbonyl monomer may vary within wide limits but it is preferred to maintain it within the range of 3:1 to 1:3 on weight basis.

The polymerization reaction is performed in aqueous emulsion system employing a free radical initiator such as hydrogen peroxide, an alkali metal or ammonium persulphate or azobisisobutyronitrile or a redox initiator pair comprising a reducing compound and an organic peroxide as is well known in the polymerization art. Usually a fraction of a part per 100 parts monomers of a molecular weight regulator such as an alkyl mercaptan containing 8-22 C atoms or mixture thereof is employed in the polymerization. The polymerization is carried out in an acidic aqueous medium; once the acid monomer is incorporated as part of the copolymer, the resulting latex emulsion may be converted to an alkaline pH. The ingredients used in the emulsion polymerization may be added either before the reaction is initiated or they may be incrementally introduced at a later stage of the reaction as it is well known in the art. It is preferred to charge initially a portion of the monomer mixture and a portion of the aqueous phase and then add the remainder of these ingredients.

The aqueous phase is a solution of one or more synthetic emulsifiers capable of supporting the polymerization in an acidic medium and maintaining a stable dispersion of the copolymer in both the acidic medium and the alkaline medium. The emulsifiers include; alkyl sulfates or sulfonates and alkylaryl sulfonates in which the alkyl groups contain from 10 to 20 carbons, for example, sodium lauryl sulfate and sodium dodecylbenzene sulfonate; alkyl and alkylaryl polyether sulfates, for example, sodium lauryl ether sulfate and sodium benzyl ether sulfate; and salts of polyethyleneoxy phosphate ester. Minor amounts of nonionic emulsifiers such as ethoxylated alkyl phenols, amides or alcohols may also be present. An emulsifier system comprising one or more acidstable sulfonated dicarboxylic acid salts or esters, e.g. salts of sulfosuccinic acid esters, is the preferred emulsifer for the preparation of a latex to be used for paper coating. An example of the preferred emulsifier is a mixture of the disodium salt of ethoxylated alcohol half ester of sulfosuccinic acid and the dihexyl ester of sodium sulfosuccinic acid. The amount of emulsifier may vary within the limits but preferably ranges from about 0.5 up to about 6 parts, with about 1 to 3 parts per 100 parts monomers most preferred.

The temperature of polymerization may vary within the range of 5° to 100°C but preferably is between 10° to 80°C. The polymerization is conducted to a high degree of conversion of monomers to polymer but it is convenient to stop the reaction when 40-65 percent latex solids are reached and then remove the excess monomer. For most uses, the pH of the latex is adjusted after polymerization from acid to alkaline to a pH of about 7 to about 11.

The thus prepared latex may be combined with fibers, e.g. cellulosic fibers, asbestos, fiberglass, by any of the conventional methods, shaped if necessary, dried and cured. Such compositions are used in carpet backings and for the production of coated paper, saturated paper and asbestos paper.

The carboxylic latex of this invention is particularly suitable for use in paper coating compositions. These compositions are aqueous pastes containing between 30 and 70 percent by weight of non-volatile materials such as fillers, starch adhesives, polymers, dispersants, buffers and defoamers. The compounding techniques, machinery and processes of paper coating are described in "Pigmented Coating Processes for Paper and Board," TAPPI Monograph Series No. 28 (1964). The filler is selected from one or more of the conventional fillers such as finely divided clays, calcium sulfoaluminate, calcium carbonate, alumina, silica, titania, zinc oxide and colorants and is used in amounts from about 1 part to about 20 parts per part of polymer, preferably at least 60 percent by weight of the total non-volatile material. Starch adhesives are used in amounts of 3 to 30 parts dry weight basis per 100 parts filler. Casein and/or soy protein can be used instead of or in addition to starch. An enzyme-converted starch is preferably used; one of the advantages of the present latex is that it is highly compatible with the starch and neither coagulates nor thickens on mixing with starch solution.

The paper coating compositions of this invention are characterized by viscosities which do not change at low and high shear stresses as much as the viscosities of known coating compositions; therefore, they are more processable under mild mixing conditions and tolerate higher filler loadings. The compositions of this invention also show improved binding power and improve the strength of coatings or fiber bonded articles; if strength is of no concern, then the amount of latex in the coating composition may be reduced, which is highly valued in paper for web off-set printing. The beneficial effect of reduced latex content in the paper coating is reflected, among others, in an increased ink absorbency.

In this specification where the following tests of the coated paper art are referred to, they were performed as follows:

STARCH COMPATIBILITY

This test measures the amount of coagulum that is formed on high speed stirring for a period of e.g. 10 minutes, a mixture of starch and latex, mixed in a proportion of 10:1 on dry weight basis. Starch is used in the form of an aqueous solution of 20-30 percent solids content.

PICK RESISTANCE OF COATED PAPERS

This test is a measure of the adhesion of the coating to paper and indicates the maximum speed at which the paper can be printed without breaking the coated surface. A calendered sheet of paper, conditioned for at least 4 hours at 21°C and 50 percent relative humidity, is printed with an ink of known tack (I.P.I. NO. 6) under a known pressure (35 Kgs.) at different speeds in an I.G.T. (Instituut voor Grafische Techniek, Amsterdam, Netherlands) printability tester. The speed at which picking first occurs is the pick resistance value.

INK ABSORBENCY OF COATED PAPERS

This test provides a measure of the quantity of ink that is absorbed by the coated paper. A photoelectric testing meter is used to measure the brightness of the coated paper before and after inking with a standard ink applied in a manner well known in the art. The ink absorbency is expressed as the percentage loss in brightness.

WET RUB RESISTANCE OF COATED PAPERS

This test measures the amount of the coating that is removed by wet brushing of the coated paper. A model 503 Taber abrader fitted with a rimmed sample holder and with a badger hair brush in place of the grinding wheel is used in this test. A piece of coated paper wetted with 10 mls of water is brushed for a fixed length of time (e.g. 100 revolutions). The water is collected and then its light transmission is measured and compared to that of the reference water. The wet rub resistance is expressed as the percentage of light transmission.

The following examples are given to illustrate the present invention.

EXAMPLE I

A latex was prepared by emulsion polymerization by use of the following ingredients where the parts are parts by weight per 100 parts total monomers:

| Monomers: | Parts |
| --- | --- |
| Butadiene-1,3 | 37 |
| Styrene | 60 |
| Carboxylic acid (1:1 ratio of acrylic and itaconic acids) | 1.5 |
| Acrolein | 1.5 |
| Aqueous Phase: | |
| Water | 90 |
| Emulsifier: | |
| (a) sodium salt of an alkyl aryl sulfonic acid | 1.0 |
| (b) octyl phenoxy polyethoxy ethanol | 0.6 |
| Potassium chloride | 0.03 |
| Ethylene diaminotetraacetic | 0.05 |
| t-Dodecyl mercaptan | 0.5 |
| Ammonium persulfate | 0.3 |
| Temperature | 55–80°C |

The polymerization reaction was initiated at 55°C with one-third of the total monomer charge and two-thirds of the aqueous phase added initially; the remainder of the monomers and aqueous phase was added 2 ½ hours after the start of the reaction and polymerized substantially to completion at a temperature raised to 80°C. A stable latex was obtained having a solids content of 52 percent and a pH of 3. The latex was treated with ammonium hydroxide to raise the pH to 7 and, after stripping off the residual monomers, further adjusted to a pH of 9. The resulting latex was found to be stable and compatible with starch, showing less than 0.01 percent coagulum when tested as described hereinbefore.

The latex was compounded to form a paper coating composition using the recipe given below:

| | Parts by weight |
| --- | --- |
| China clay | 85 |
| Precipitated calcium carbonate | 15 |
| Latex (dry weight basis) | 10 |
| Enzyme-converted starch | 10 |

The formulation, adjusted to 62 percent solids with water, had a viscosity (Brookfield 4 spindle at 100 r.p.m. at 20°C) of 650 centipoises. The coating was then applied to a paper substrate by a bench coater at a rate of about 7 lbs/ream and the coated paper was dried, calendered and then tested, as hereinbefore described, with the following results. As a control, a similarly prepared coated paper, but employing a conventional carboxylated styrene/butadiene latex containing 60 percent styrene monomer units and no acrolein, was also tested. The improvement afforded by the experimental latex of this example is shown below:

| | Experimental Latex | Control Latex |
| --- | --- | --- |
| Pick Resistance (feet per minute) | 150 | 122 |
| Ink Absorbency (% loss in brightness) | 18.6 | 16.3 |
| Wet Rub (% light transmission) | 81.2 | 69.5 |

EXAMPLE II

A latex was prepared as in Example I using methacrolein as the unsaturated carbonyl compound. The polymerization recipe was as follows, in parts by weight:

| Monomers: | Parts |
| --- | --- |
| Butadiene | 37 |
| Styrene | 60 |
| Itaconic acid | 1.0 |
| Acrylic acid | 0.5 |
| Methacrolein | 1.5 |
| Aqueous Phase: | |
| Water | 90 |
| Disodium salt of ethoxylated half ester of succinic acid | 0.4 |
| Dihexyl ester of sodium sulfosuccinate | 1.35 |
| Potassium chloride | 0.2 |
| Trisodium phosphate | 0.05 |
| t-Dodecyl mercaptan | 0.5 |
| Ammonium persulfate | 0.3 |

The polymerization reaction was initiated at 60°C with one-third of the total monomer change and two-thirds of the aqueous phase present in the reactor. The remainder of the monomer mixture and of the aqueous phase was added after the initial charge was substantially polymerized. The temperature was then raised to about 75°C and the reaction was essentially completed in 10 ½ hours producing a stable latex of 51.4 percent solids and a pH of 3.4. The latex was made alkaline and stripped of residual monomers as in Example I. It was then compounded using the paper coating formulation of Example I except for the enzyme-converted starch which was replaced by an oxidized starch. A carboxylated styrene/butadiene latex prepared in the same polymerization system but with methacrolein omitted was used as control for comparison.

The above coating compositions were each applied to paper, the coated paper was dried and tested as described in Example I. The results are shown below:

| | Methacrolein Containing Latex | Control Latex |
| --- | --- | --- |
| Pick Resistance (feet per minute) | 248 | 188 |
| Ink Absorbency (% loss in brightness) | 11.8 | 11.7 |
| Wet Rub (% light transmission) | 91.5 | 76.0 |

The above data show that the methacrolein containing latex produces a significantly better coating composition then the conventional carboxylic latex.

EXAMPLE III

Example II was repeated except that methyl vinyl ketone replaced methacrolein as the carbonyl-containing monomer. The coated paper test results were as follows:

|  | Experimental Latex | Control Latex |
| --- | --- | --- |
| Pick Resistance (feet per minute) | 220 | 188 |
| Ink Absorbency (% loss in brightness) | 12.4 | 11.7 |
| Wet Rub (% light transmission) | 86.0 | 76.0 |

EXAMPLE IV

A further coating composition was prepared by compounding 7.5 parts of dry latex solids of an experimental latex, 7.5 parts of dry weight of casein and 100 parts by weight of China clay and adjusting its solids to 50 percent with water. The latex was prepared as described in Example II except that methacrolein was replaced by 1.5 parts of acrolein in the polymerization recipe. A control composition was made in the same manner using a corresponding carboxylated butadiene/styrene latex free of acrolein. The compositions were applied to paper and tested as described in Example I. The results were as follows:

|  | Experimental Latex | Control Latex |
| --- | --- | --- |
| Pick Resistance (feet per minute) | 245 | 208 |
| Ink Absorbency (% loss in brightness) | 23.0 | 19.4 |
| Wet Rub (% light transmission) | 94.5 | 89.5 |

EXAMPLE V

The latex of this invention was further tested in an adhesive composition for tufted carpets, i.e., to bind an upper layer of nylon tufts anchored in a woven-jute base to a second jute backing (scrim). Two latices were prepared in a polymerization recipe of Example II except for a different monomer mixture. The monomer mixture was as follows:

|  | Latex HS-1 | Latex HS-2 |
| --- | --- | --- |
| Butadiene-1,3 | 52.5 | 52.5 |
| Styrene | 44.5 | 41.5 |
| Acrylic acid | 2.25 | 1.5 |
| Acrolein | 0.75 | 4.5 |

The latices were made alkaline and then compounded using the following formulation:

| Latex | 100 parts (dry basis) |
| --- | --- |
| Talc filler | 300 parts |
| Antioxidant | 0.5 part |
| Water | To adjust to 72% solids |
| Sodium polyacrylate thickener | To adjust the viscosity to 7000 centipoises |

The compounds were applied at a rate of 32 ounces, on dry weight basis, per square yard of carpet. The primary jute base and scrim were contacted, assembled and the assembly was then allowed to dry in an oven at a temperature of 300°F. A rapid development of strength of adhesion of the scrim to the primary jute base was observed and within less than 10 minutes, the resistance to the delamination at elevated temperatures of about 200°F was up to about 8 lbs/2 inch strip as measured by a tension tester.

The above two compounds were also tested for mechanical stability in a Hamilton-Beach mixer. They were found to be stable and did not coagulate or thicken for at least 25 minutes of mixing. This property is highly desirable in continuous processes of carpet backing where latex compounds are subjected to prolonged agitation.

EXAMPLE VI

Crepe-type paper was saturated with latex HS-1 of Example V, dried for 48 hours at 25°C and cured in a forced air oven for 10 minutes at 138°C. The thus-treated paper was tested and the results are as follows:

| Pick up, i.e. the increase in weight based on dry paper weight (%) | 101 |
| --- | --- |
| Tensile Strength (pounds per inch) | 19.8 |
| Elongation at Break (%) in machine direction | 17 |
| Finch Tear Strength (pounds in machine direction) | 19.2 |
| Delamination (ounces per inch) | 72 |

The above results show that the latex is suitable for paper saturation e.g., for the preparation of masking tape.

What is claimed is:

1. A composition comprising (A) an alkaline latex of a copolymer of (a) at least 25 parts of an acyclic $C_4$-$C_8$ conjugated diolefin selected from butadiene-1,3, isoprene, chloroprene and 2,3-dimethyl butadiene-1,3, (b) at least 25 parts of a mono-olefinically unsaturated copolymerizable compound which is free of carbonyl and carboxyl groups selected from styrene, substituted styrenes, esters of acrylic acids and $C_1$-$C_6$ alcohols and mixtures thereof, (c) 1-3 parts of an olefinically unsaturated carboxylic acid selected from (a) unsaturated carboxylic acids containing 3-5 carbon atoms, (b) cinnamic acid and (c) mixtures thereof and (d) 1-3 parts of an olefinically unsaturated carbonyl compound of the general formula $H(R_1)C=C(R_2)-C(R_3)O$ where $R_1$ is selected from hydrogen and $C_1$-$C_6$ monovalent hydrocarbon radicals and $R_2$ and $R_3$ are selected from hydrogen and $C_1$-$C_2$ alkyl radicals selected from acrolein, alpha-methyl, beta-methyl and beta-phenyl acroleins, methyl vinyl ketone and mixtures thereof, said parts being parts by weight per 100 parts by weight of copolymer, (B) and inert filler in amount of about 1-20 parts per one part by weight of copolymer, and (C) a starch or protein adhesive in amount of about 3-30 parts per 100 parts by weight of filler.

2. The composition of claim 1 wherein the copolymer is a copolymerizate of (a) 25-40 parts of said conjugated diolefin, (b) 50-70 parts of said mono-olefinically unsaturated carbonyl and carboxyl-free compound, (c) 1-3 parts of said olefinically unsaturated carboxylic acid and (d) 1-3 parts of said olefinically unsaturated carbonyl compound, the ratio of said carboxylic acid to said carbonyl compound being between 3:1 and 1:3.

3. The composition of claim 1 wherein said diolefin (a) is butadiene-1,3 and is present in amount of 50–70 parts by weight.

4. The composition of claim 2 wherein said copolymer is a copolymerizate of butadiene-1,3, styrene, acrylic acid and acrolein.

5. The composition of claim 2 wherein it contains between 30 and 70 weight percent of non-volatile materials.

6. A paper coated with the composition of claim 2.

7. The composition of claim 3 wherein said copolymer is a copolymerizate of butadiene-1,3, styrene, acrylic acid and acrolein.

8. A process comprising forming a composition comprising a blend of (A) an alkaline latex of a copolymer of at least (a) 25 parts of an acyclic conjugated diolefin, (b) 25 parts of a mono-olefinically unsaturated copolymerizable compound which is free of carbonyl and carboxyl groups, (c) 0.1–5 parts of an olefinically unsaturated carboxylic acid and (d) 0.1–5 parts of an olefinically unsaturated carbonyl compound of the general formula $H(R_1)C=C(R_2)-C(R_3)O$ where $R_1$ is a hydrogen or a $C_1-C_6$ monovalent hydrocarbon radical and $R_2$ and $R_3$ are hydrogen or $C_1-C_2$ alkyl radicals, said parts being parts by weight per 100 parts by weight of copolymer, (B) an inert filler in amount of about 1–20 parts per one part by weight of copolymer, and (C) a starch or protein adhesive in amount of about 3–30 parts per 100 parts by weight of filler coating a sheet of paper with said composition and drying the coated paper.

9. The process of claim 8 wherein the copolymer is a copolymerizate of (a) 25–40 parts of said conjugated diolefin, (b) 50–70 parts of said mono-olefinically unsaturated carbonyl and carboxyl-free compound, (c) 1–3 parts of said olefinically unsaturated carboxylic acid and (d) 1–3 parts of said olefinically unsaturated carbonyl compound, the ratio of said carboxylic acid to said carbonyl compound being between 3:1 and 1:3.

10. The process of claim 9 wherein said diolefin (a) is butadiene-1,3, said unsaturated carbonyl and carboxyl-free compound (b) is selected from styrene, a-methylstyrene, achlorostyrene, vinyl toluene and mixtures thereof, said unsaturated carboxylic acid (c) is selected from acrylic, methacrylic, ethacrylic, itaconic and cinnamic acids and mixtures thereof, and said carbonyl compound (d) is selected from acrolein, a-methyl acrolein, b-methyl acrolein, b-phenyl acrolein, methyl vinyl ketone and mixtures thereof.

* * * * *